United States Patent [19]
Bleicher et al.

[11] Patent Number: 4,644,835
[45] Date of Patent: Feb. 24, 1987

[54] MOTOR-DRIVEN CIRCULAR SAW

[75] Inventors: Manfred Bleicher, Leinfelden; Ulrich Bohne, Kohlberg, both of Fed. Rep. of Germany

[73] Assignee: Robert Bosch GmbH, Stuttgart, Fed. Rep. of Germany

[21] Appl. No.: 753,677

[22] Filed: Jul. 10, 1985

[30] Foreign Application Priority Data

Sep. 27, 1984 [DE] Fed. Rep. of Germany ....... 3435454

[51] Int. Cl.$^4$ .................. B23D 45/04; B27B 5/06
[52] U.S. Cl. ................................ 83/471.2; 83/490
[58] Field of Search .................. 83/490, 471.2, 469, 83/647.5; 125/13 R; 30/388

[56] References Cited

U.S. PATENT DOCUMENTS

| | | | |
|---|---|---|---|
| 530,639 | 12/1894 | Ehrhardt | 83/490 |
| 2,397,974 | 4/1946 | Morrow et al. | 83/490 X |
| 3,213,731 | 10/1965 | Renard | 83/490 X |
| 3,611,859 | 10/1971 | Avakian | 83/490 X |
| 4,510,385 | 4/1985 | Cromeens | 83/490 X |

FOREIGN PATENT DOCUMENTS 2851651 6/1979 Fed. Rep. of Germany .

Primary Examiner—James M. Meister
Attorney, Agent, or Firm—Michael J. Striker

[57] ABSTRACT

In a motor driven circular saw, a saw blade drive is provided, by which a rotary movement of a saw blade, supported on a rotary blade shaft, is superimposed by a back and forth-movement in the direction of sawing to produce a forward stroke and a backward stroke of the blade and to thus improve cutting efficiency of the saw. The saw blade drive includes a pinion at the end of a motor shaft, a first gear meshed with the pinion and supported on the saw blade shaft, a second gear meshed with the first gear and having a cam and eccentrically positioned together with the cam on a stationary axle. A coupling rod connects the cam with the saw blade shaft to impart to the latter the back-and-forth movement.

4 Claims, 5 Drawing Figures

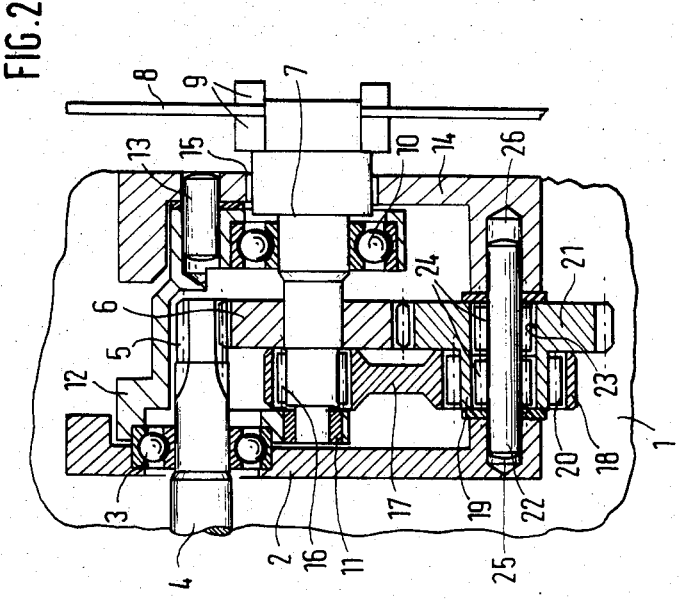
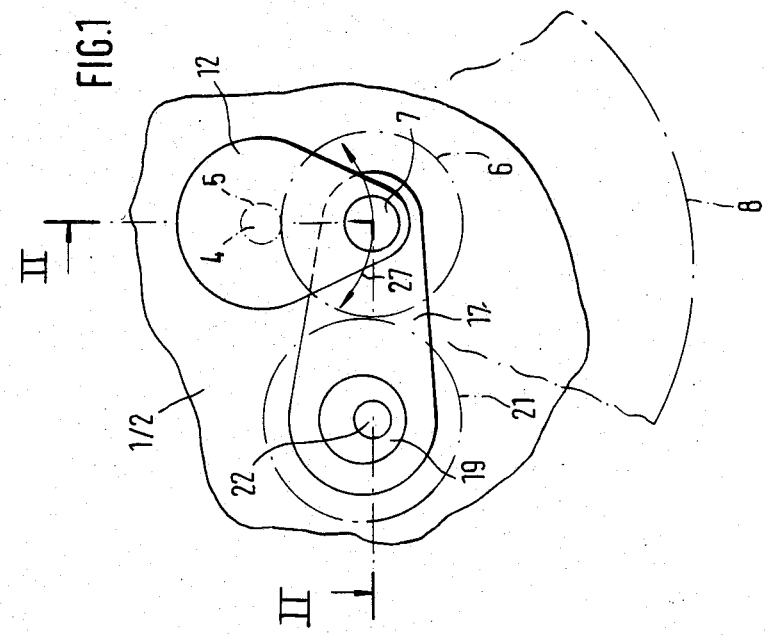

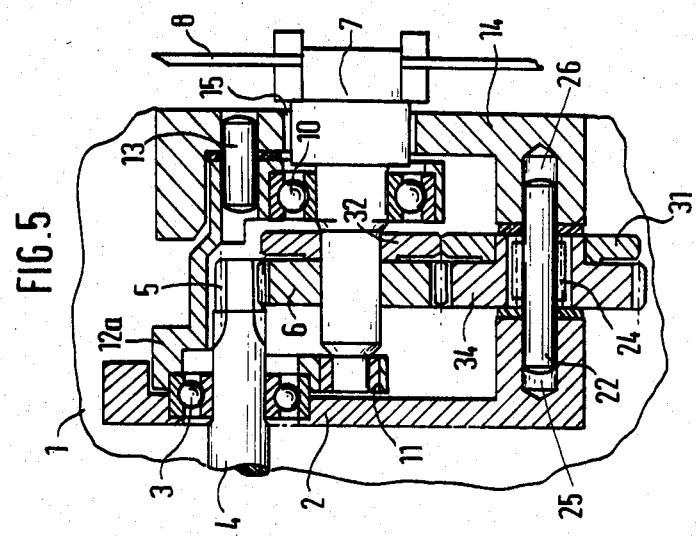
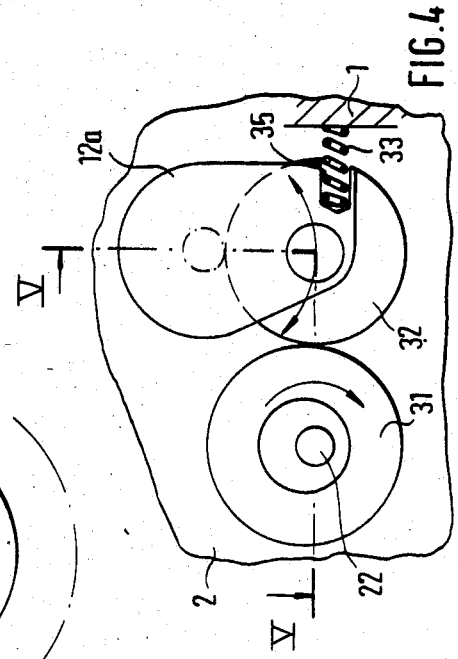
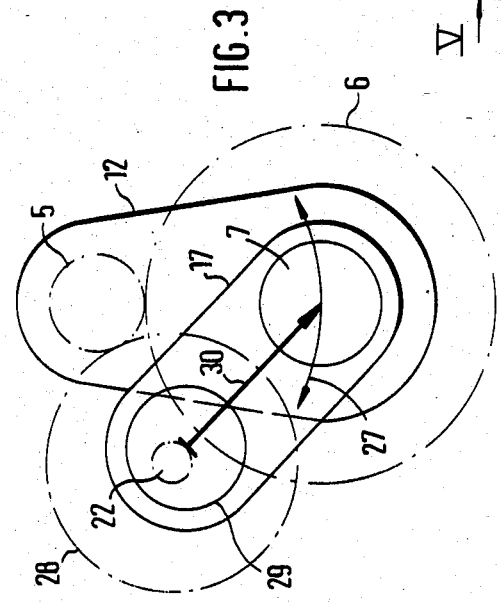

MOTOR-DRIVEN CIRCULAR SAW

BACKGROUND OF THE INVENTION

The present invention relates to a circular saw of the type including a shaft carrying a saw blade and movable in the direction normal to the axis of elongation thereof relative to the housing of the saw.

One of circular saws of the type under discussion has saw blade shafts positioned on a rocking arm. The distance between the shafts and the rocking arm can be adjusted to a plate-shaped workpiece being treated. It is also possible to saw workpieces of various widths simultaneously with at least one saw blade from above and at least one blade from below. This decreases cutting efficiency per one saw blade and improves the advancement of the saw.

Such an arrangement is, however, rather expensive and difficult to control in hand-held circular or disk saws. Thus the improvement in a cutting efficiency relative to a motor output has been desired.

SUMMARY OF THE INVENTION

It is an object of the present invention to provide an improved circular saw.

It is another object of this invention to substantially improve a relative cutting efficiency of the disk saw by very simple means.

These and other objects of the invention are attained by a motor-driven circular saw, comprising a housing; a rotary saw blade shaft carrying a saw blade and being movably supported relative to said housing; and stroke drive means connected to said shaft, said means moving said shaft during operation of the circular saw perpendicularly to an axis of elongation of said shaft back and forth between two end positions.

Due to the stroke-producing means of the saw blade shaft the movement of the shaft perpendicularly to its axis of elongation superimposes the advancement movement of the shaft carrying the blade. This substantially improves the advancement of the saw into a workpiece without, however increasing a machine drive output.

It is specifically advantageous that a frequency of the stroke-producing means can be varied in dependence on a number of revolutions with which said shaft rotates. This can be attained not only by various mechanical drive means but also by a known electric oscillatory armature drive.

The saw may further include a rocking arm, said shaft being supported on said rocking arm.

The rocking arm may be supported on a motor shaft which drives, e.g. rotates said saw blade shaft.

The motor shaft may be an armature shaft of a motor of the circular saw, as known in the art.

The stroke drive means may include an axle rigidly supported in said housing, a first gear eccentrically positioned on said axle, and a second gear mounted on said saw blade shaft and meshing with said first gear. The saw may further include a cam positioned on said axle and a lifting rod mounted on said saw blade shaft, said lifting rod coupling said cam and said saw blade shaft to each other.

The first gear and the second gear meshed therewith may have a different number of teeth.

The rocking arm may be U-shaped.

In a modified arrangement the stroke drive means may include an axle rigidly supported in said housing, a pinion mounted on a motor shaft for driving said saw blade shaft, a gear meshed with said pinion, a cam engaged with said gear for joint rotation therewith, and a lifting rod, said cam being eccentrically positioned on said axle, said lifting rod coupling said cam and said saw blade shaft to each other.

In a still another modified arrangement the stroke drive means may include an axle rigidly supported in said housing, a first gear eccentrically positioned on said axle, a first disc coaxially mounted to said first gear and rotatable therewith and having an outer diameter corresponding to a pitch diameter of said first gear, a second gear meshed with said first gear and mounted on said saw blade shaft and connected to the motor shaft for driving said saw blade shaft, a second disc mounted on said saw blade shaft with said second gear and having an outer diameter corresponding to a pitch diameter of said second gear, and a spring which acts to hold said first disc and said second disc in abutting relationship with each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic front view of the saw power transmission unit of the disk saw of the first embodiment of the invention;

FIG. 2 is a sectional view taken through the line II—II of FIG. 1;

FIG. 3 is a schematic view of the saw stroke transmission unit of another embodiment of the invention;

FIG. 4 is a schematic front view of the saw stroke transmission unit of yet another embodiment in which a form-locking connection between the saw stroke drive and the saw blade shaft is replaced by a frictional connection; and FIG. 5 is a cross-sectional view taken through the line V—V of FIG. 4.

DETAILED DESCRIPTION OF THE PREFERRED EMBODIMENTS

Referring now to the drawings in detail, and firstly to FIGS. 1 and 2 thereof, reference numeral 1 designates a housing of the circular or disk saw in which a casing of the transmission unit 2 is positioned. A motor shaft 4 of a non-shown motor is arranged in a ball bearing 3 in casing 3. A pinion 5, which meshes with a gear 6, is mounted to the end of the motor shaft 4. Gear 6 is rigidly supported on a saw blade shaft 7. A saw blade 8 is rigidly clamped on the shaft 7 by means of a clamping device 9. The saw blade shaft 7 is supported by means of a ball bearing 10 and a sleeve bearing 11 in a rocking arm 12. This rocking arm is U-shaped and is in turn positioned on the outer ring of the ball bearing 3 at its one end and on a pin 13, positioned in a bearing cover 14, at its other end.

The saw blade shaft 7 extends outside through an opening 15 formed in the bearing cover 14. A stroke lever or lifting rod 17 is supported on the saw blade shaft 7 by means of a needle bearing 16 near the gear 6. The saw blade stroke rod 17 has a lug or extension 18 at the end thereof, which lug surrounds a cam 19. A needle bearing 20 is inserted into the bore provided in the lug 18 so that this bearing surrounds cam 19. Cam 19 is formed by a collar or boss of a gear 21 which has less teeth than the gear 6, with which gear 21 is in mesh. The gear 21 with cam 19 are supported by an axle 22. The latter extends through an excentric bore 23 formed in gear 21 and cam 19, formed as a circular extension or boss of gear 21, as mentioned above. Needle bearings 24 are interpositioned between the axle 22 and gear 21 with cam 19. Axle 22 is rigidly mounted in bores 25 and 26 of the casing 2 and bearing cover 14, respectively. A double arrow 27 in FIG. 1 indicates a forced oscillating motion of the saw blade shaft 7 and blade 8 therewith, caused by the rocking arm 12.

After switching on the drive of the circular saw the motor shaft 4 drives the saw shaft 7 with the blade 8 thereon via the pinion 5 and gear 6. Thereby the saw blade 8 is rotated about its axis and simultaneously oscillates relative to the motor shaft 4. The oscillatory movement is effected by the saw stroke drive or transmission which includes the gear 21 and cam 19. The gear 6, meshed with the gear 21, transmits its rotary movement to the gear 21 and cam 19 thereby. The eccentric position of the gear 21 with cam 19 on the stationary axle 22 and the rod 17 cause the saw blade shaft 7 to follow the eccentrically movable outer peripheral face of the cam 19. Inasmuch as the eccentricities of the cam 19 and gear 21 are the same the tooth engagement between the gears 6 and 21 continually remains satisfactory. The size and the shape of the opening 15 provides for a sufficient freedom of the movement of saw blade shaft 7. Due to a various number of teeth of gear 6 and gear 21 the saw blade with its teeth, engaged during the pre-stroke, makes a circular segment movement about the axis of the blade. Thus all the teeth of the saw blade 8 are gradually applied to a workpiece being treated.

In the embodiment illustrated in FIG. 3, the transmission of the drive of the saw blade 8 is modified as compared to that of FIGS. 1 and 2. In this modified embodiment pinion 5 drives directly the gear 6 and also a gear 28 which is laterally offset relative to gear 6. The housing-stationary axle 22 is supported so that a pitch circle of pinion 5 is in contact with the gear 28 supported on the axle 22. The lifting rod 17 is in this embodiment the same as in the embodiment of FIGS. 1 and 2. Cam 19 is replaced by a cam 29 which is separate from gear 28. Cam 29 is positioned, however, eccentrically relative to the axle 22. If the transmission angle for the transmission of the force necessary to oscillate the saw blade 7 by the cam 29, is not very favorable (arrow 30) the size of the oscillating masses is however, reduced. The gear 28 rotates in contrast to the gear 21 without imbalance.

In the embodiment, shown in FIGS. 4 and 5, in place of the stroke or lifting rod 17 of the previously described embodiments two discs 31 and 32 are provided, of which the first disc is mounted on the axle 22 and the second disc is supported on the saw blade shaft 7. A rocking arm 12a of the construction different from that of the embodiments of FIGS. 1, 2 and 3, is supported at its two ends on the bearing 3 and pin 13, respectively. A helical spring 33 cooperating with the rocking arm 12a is also provided in this modified embodiment. The first disc 31 is arranged on a first gear 34 which has replaced gear 21 of the embodiment of FIGS. 1, 2. Gear 34 is supported on the elongated axle 22 by means of a needle bearing 24. The outer diameter of the first disc 31 corresponds to the diameter of the pitch diameter of the first gear 34. The outer diameter of the second disc 32 corresponds to the pitch diameter of the second gear which is here gear 6, similarly to the embodiments of FIGS. 1 and 2, and 3.

The helical spring 33 is inserted in a recess or bore 35 formed in the rocking arm 12a. This spring is supported at one end thereof against the housing 1 of the circular saw so that the spring urges the rocking arm 12a towards the axle 22. Thereby the peripheral surfaces of the discs 31 and 32 abut each other. The first gear 34 and the second gear 6 are thereby maintained in a force-locking engagement with each other. This embodiment of the drive transmission unit of the invention is less expensive in manufacture than the embodiment of FIG. 1. The manufacture of the shaped stroke rod 17 is more expensive than the production of two simple discs 31 and 32. Additionally, only a single needle bearing and a helical spring are provided in this modified embodiment. Four needle bearings are required for the same purpose in the embodiment of FIGS. 1, 2.

The mode of operation of the embodiment of FIGS. 4, 5 substantially corresponds to that of FIGS. 1, 2 and also FIG. 3. It should be taken into consideration, however that the pre-stroke coincides with the compression of the helical spring 33. The working pressure is thus taken up by discs 31 and 32. The helical spring 33 only causes the rocking arm 12 to sway back.

It will be understood that each of the elements described above, or two or more together, may also find a useful application in other types of circular saws differing from the types described above.

While the invention has been illustrated and described as embodied in a circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims; we claim:

1. A motor-driven circular saw, comprising a housing; a rotary saw blade shaft carrying a saw blade and being movably supported relative to said housing; and stroke drive means connected to said shaft, said means moving said shaft during operation of the circular saw perpendicularly to an axis of elongation of said shaft back and forth between two end positions, said stroke drive means including an axle rigidly supported in said housing, a first gear eccentrically positioned on said axle, a first disc coaxially mounted to said first gear and rotatable therewith and having an outer diameter corresponding to a pitch diameter of said first gear, a second gear meshed with said first gear and mounted on said saw blade shaft and connected to a motor shaft for driving said saw blade shaft, a second disc mounted on said saw blade shaft with said second gear and having an outer diameter corresponding to a pitch diameter of said second gear, and a spring which acts to hold said first disc and said second disc in abutting relationship with each other.

2. The saw as defined in claim 1, wherein a frequency of said means is varied in dependence on a number of revolutions with which said shaft rotates.

3. The saw as defined in claim 1; further including a rocking arm, said shaft being supported on said rocking arm.

4. The saw as defined in claim 3, wherein said rocking arm is U-shaped.

* * * * *